Sept. 23, 1958     J. H. BOOTH     2,853,326
SPRINGLESS WEAR COMPENSATING JOINT
Filed May 25, 1954
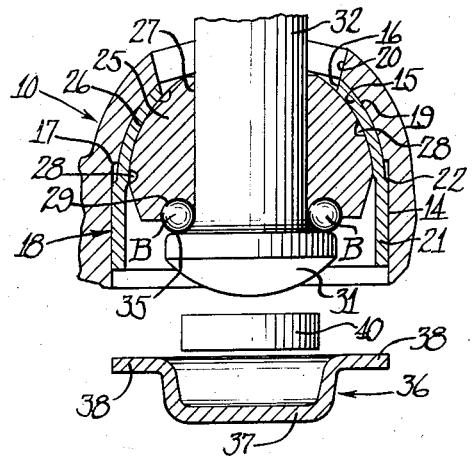
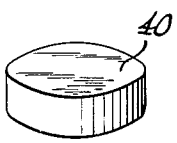
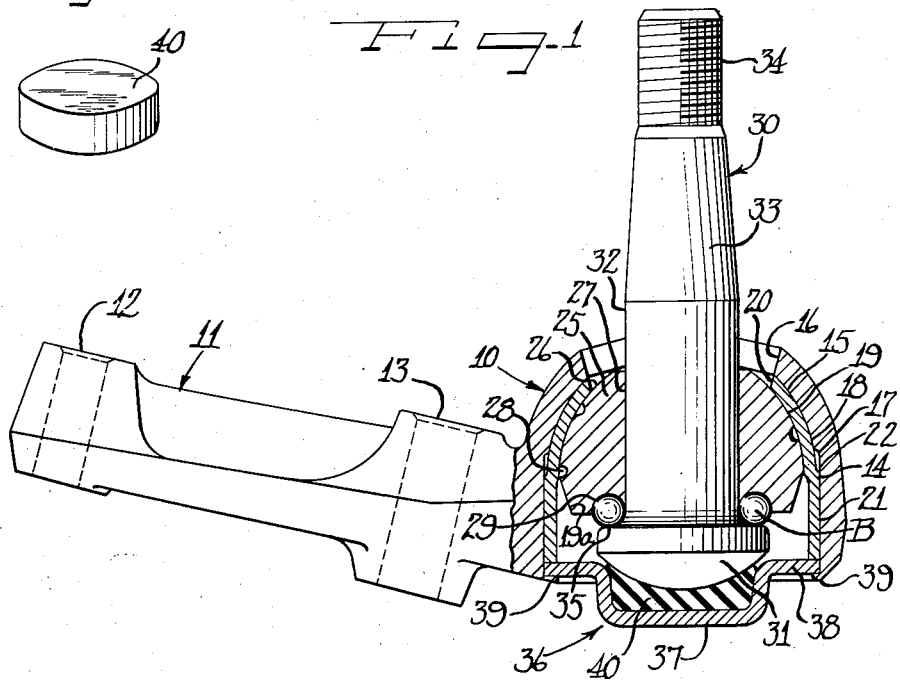
James H. Booth

United States Patent Office 2,853,326
Patented Sept. 23, 1958

2,853,326
SPRINGLESS WEAR COMPENSATING JOINT

James H. Booth, Corunna, Mich., assignor to Thompson Products, Inc., Cleveland, Ohio, a corporation of Ohio Application May 25, 1954, Serial No. 432,232

2 Claims. (Cl. 287—90)

This invention relates to a springless wear compensating joint accommodating tilting and rotating movements.

More particularly, this invention deals with a multiple bearing type of ball joint having the relatively movable parts thereof urged into proper bearing relationship by means of a single inexpensive plug of rubber or other elastomeric material.

The joints of this invention are especially useful in automotive steering linkages, wheel suspensions, and the like.

This invention replaces the heretofore necessary wear takeup spring and spring seat of a ball joint with a single resilient plug that not only better serves the function of these two replaced elements but also provides a self-conforming bearing seat for the stud thereby accommodating increased tolerance limits of the joint components.

The preferred joint of the present invention includes a forged steel open-ended socket housing lined with a conforming open-ended stamped hardened steel socket insert. The insert pivotally supports a flat bottomed, centrally apertured fragmental spherical bearing member or ball element. The aperture or bore of the ball element, in turn, receives, in rotatable relation, the cylindrical shank of a metal stud having a round bottom head providing a shoulder underlying the flat bottom of the ball element. A ring of ball bearings or other anti-friction elements is preferably interposed between the flat bottom and the shoulder to facilitate rotation of the stud in the ball element. The stud shank projects from the ball element freely through the smaller of the two registered openings of the socket housing and its socket insert liner. The larger or bottom open end of the socket housing and its liner socket insert are closed by a metal disk which is spun or peened into the socket housing against the bottom of the socket insert. This disk has a central well receiving a thick disk-like rubber plug with a normally flat top deformed through interparticle flow of the rubber to become compressively "loaded" and form a bearing accommodating rotation of the stud while simultaneously resiliently urging the stud toward the smaller opening of the socket housing to thereby maintain the joint components in proper bearing relationship.

The hardness of the elastomeric plug can be varied to vary the "stiffness" of the joint.

Since the plug is composed of true elastomeric material, it cannot "break" like a spring and no sudden failure of the joint can occur. Further, since the elastomeric material will conform to the shapes and sizes of surrounding metal parts, the gap dimension between the stud head and the closure disk is no longer critical as in the case of spring and spring seat equipped joints where too narrow a gap collapses the spring and too wide a gap produces looseness and unrestricted end play between the parts. In the now provided joints, a narrow gap only results in increased flow of the plug over more of the stud head area while a wide gap results in lessened deformation of the plug, but in either event the plug will resiliently bottom the stud into conforming shape with the round bottom of the stud head.

A simpler, safer, more economical and easier maintainable ball joint assembly is thereby produced.

It is then an object of this invention to provide a springless wear compensating metal joint assembly.

Another object of this invention is to provide a ball and socket-type joint assembly wherein the conventional metal spring and spring seat are replaced with a single elastomeric plug.

A still further object of the invention is to provide a multi-bearing ball and socket joint for automotive steering linkages or wheel suspensions wherein a rigid ball member tiltable in a rigid ball socket and a rigid stud member rotatable in the ball member are simultaneously and continually urged into proper bearing relation with each other and with the socket by a single plug of elastomeric material.

Still another object of this invention is to provide a load carrying multiple bearing ball and socket joint wherein a forged metal outer housing is lined with a stamped metal insert providing a fragmental spherical bearing wall for a flat bottomed metal ball which rotatably supports a metal stud that is resiliently urged into the ball by a rubber plug carried in a closure gap for the outer housing.

Yet another object of this invention is to provide, in a ball and socket joint assembly, a closure disk for the socket housing which has a central well snugly supporting a rubber plug to expose a deformable end face of the plug to a stud head in the housing and to deform this exposed face of the plug into conformity with the stud head for forming a resilient bearing surface when the closure disk is secured in position in the housing.

Other and further objects of this invention will be apparent to those skilled in the art from the following detailed description of the annexed sheet of drawings which, by way of a preferred example only illustrates one embodiment of the invention.

On the drawings:

Figure 1 is a side elevational view, with parts broken away and shown in vertical cross-section, of a ball and socket joint assembly according to this invention;

Figure 2 is a fragmentary partially exploded sectional view, with parts in elevation, of the joint assembly of Figure 1 illustrating the manner in which the component parts are assembled; and Figure 3 is a perspective view of the elastomeric plug employed in the joint assembly as a combination seat and spring.

As shown on the drawings:

In Figures 1 and 2, the reference numeral 10 designates generally a forged metal outer socket or housing having a laterally extending arm or stem 11 integral therewith and adapted to be anchored to a wheel suspension arm or the like by means of bolts (not shown) inserted through holes 12 and 13 formed through mounting pads on the arm or stem. The housing 10 is in the form of an inverted open-ended cup and has a substantially cylindrical interior bore or portion 14 inwardly of its large bottom open end and a segmental spherical bore or portion 15 converging to a reduced diameter top opening 16. The diameter of the cylindrical portion 14 is slightly greater than the large diameter of the segmental spherical portion 15 to provide an annular shoulder 17 in the housing.

A stamped hardened steel ball socket liner or insert 18 is nested in the housing 10 and has a segmental spherical bearing portion 19 bottomed on the housing portion 15 and converging to a reduced diameter opening 20 which registers with the opening 16. The insert 18 has a cylindrical portion 21 mating with the portion 14 of the housing 10 and the insert portions 19 and 21 are joined at an external shoulder 22. It will be noted that a gap is provided between the shoulders 17 and 22 to accommodate variations in sizes of the insert and housing to thereby insure a tight lining fit of the insert in the converging portion 15 of the housing.

A segmental metal ball member or bearing member 25 having a segmental spherical bearing surface 26 and an axial cylindrical bore 27, is disposed with the bearing surface 26 in conforming bearing relationship with the bearing surface 19 of the insert 18. The ball member 25 is greater than hemispherical and the portion thereof beyond the great circle is beveled back at 19a to be spaced considerably inward from the insert portion 21 to insure that the two surfaces will never contact even in the extreme angled position of the ball in the insert. The portion of the ball beyond the great circle serves to increase the bearing length of the bore 27. It will thus be understood that the ball member 25 is freely tiltable on the bearing surface 19 of the liner or socket insert 18.

The fragmental spherical bearing wall 26 of the ball member 25 is preferably provided with one or more spiral grooves 28 to distribute lubricant from the interior of the assembly over the bearing wall.

A ball race groove 29 is formed in the bottom flat face of the bearing member 25 around the cylindrical bore 27.

A metal stud 30 with a round bottom head 31 on one end thereof underlying the flat bottom of the ball member 25 has an adjacent cylindrical shank portion 32 extending through the bore 27 of the ball member in rotatable relationship with the ball member. The stud shank then extends through the registered apertures 20 and 16 of the insert and housing, respectively, and adjacent the cylindrical shank portion 32 there is provided a tapered shank portion 33 which is adapted to be wedged into a mated tapering eye of a connecting member (not shown) as is conventional. The upper end 34 of the shank of the stud is provided with an externally threaded portion to receive a nut for locking the eye member on the tapered portion 33.

The stud has a shoulder 35 between its head 31 and the adjacent cylindrical shank 32. This shoulder forms a ball race 35 cooperating with and confronting the ball race 29. A ring of ball bearings B is disposed between the flat bottom of the ball member 25 and the stud head 31 to ride in the ball races 29 and 35 and thereby facilitate rotation of the stud in the ball member even under high axial load on the stud.

The large opening in the bottom end of a socket housing 10 is closed by a metal disk 36 having a downwardly dished central portion or well 37 and a laterally extending flat marginal portion 38 surrounding the well portion 37. The periphery of the margin fits snugly in the bore 21 of the forged housing 10 and is abutted against the bottom end of the socket insert or liner. The housing 10 extends beyond the outer face of the closure disk when the disk is bottomed against the insert and a portion of this housing is then spun or peened inwardly over the peripheral edge of the closure disk at 39 to securely lock the closure disk in the housing. The disk thereby also closes the large bottom opening of the insert 18.

The central well or dished portion 37 of the closure disk 36 snugly receives a flat faced cylindrical plug composed of resilient, flexible, elastomeric material. As illustrated in Figure 1, when the closure disk is secured in position in the housing, the top flat face of this plug 40 is deformed by the rounded bottom 31 of the stud head to provide a bearing seat for the stud head. Deformation of the elastomeric material will compressively load the material through interparticle flow and the plug, in attempting to regain its unloaded or free state illustrated in Figures 2 and 3, will resiliently urge the stud toward the convergent end of the housing thereby holding the components of the joint in good bearing engagement. If the gap between the bottom of the stud head and the closure disk varies in mass production of the joint of this invention, the rubber plug is effective to accommodate this variation without interfering with the operating efficiency or wear life of the joint. A wide gap will merely result in lessened deformation of the plug while a narrow gap will result in increased deformation of the plug. In either event, however, the plug forms a spring seat and spring for the stud.

By "resilient, flexible, elastomeric material," is meant a material which has good elastic properties and is capable of withstanding compression loads for extended periods without setting and which is capable of withstanding the rotating action of the stud head without seizing. The material should also preferably be resistant to the action of greases, oils and similar lubricants which might be packed in the chamber between the ball member and closure disk. Examples of suitable elastomeric materials are natural rubber, synthetic rubbers such as are produced by polymerization of butadiene alone or with styrene, by the interaction of sodium polysulphides and dihalides, by the polymerization of chloroprene, by the polymerization of isobutylene or by the polymerization and plasticization of vinyl chloride.

In addition, synthetic elastomers such as polyethylene, polyvinyl esters including polyvinyl acetate, polyvinyl chloride and polyvinylidene chloride, elastomeric alkyds, and elastomeric silicones are useful. The socket insert or liner 18 is preferably prehardened to a Rockwell hardness of around 62 "C" or greater and the use of this liner avoids the necessity for hardening the outer housing 10 so that it can retain the desired toughness of forged metal. The spherical bearing surface 26 and the ball member 25 preferably is hardened to the same value as the insert 18. The ball race areas 29 and 35 of the ball member and stud are also preferably hardened to resist wear. If desired, the anti-friction elements such as the balls B can be eliminated and the stud head can ride directly on the bottom face of the ball member.

As indicated in Figure 2, the assembly of the joint of this invention is simple, merely requiring nesting of the parts, insertion of the plug 40 in the dished portion 37 of the cap 36, forcing of the cap into the housing against the bottom of the insert thereby "loading" the plug against the stud head and then peening or spinning the edge of the housing over the marginal periphery of the closure cap.

If desired, the insert could be supplied as a preloaded cartridge for the forged housing by securing the closure cap or disk 36 into the insert and then merely staking or otherwise securing the thus sealed insert assembly in the outer housing path.

The joints of this invention are adapted to be initially packed with grease or other lubricant at the time of assembly to provide a so-called "greased-for-life" joint or alternately, of course, the joint housing could be equipped with a suitable grease fitting for periodic introduction of lubricant.

From the above description, it should be understood that this invention now provides a safe, simple, inexpensive springless joint wherein a single plug of elastomeric material serves the multiple capacity of providing a seat for a stud head and of continually urging the components of the joint into proper bearing relation so as to compensate for wear of the bearing surfaces and thereby prevent excessive end play or looseness between the joint part.

It will, of course, be appreciated that various modifications and variations may be made in the instant invention without departing from the novel scope thereof.

I claim as my invention:

1. A springless wear compensating ball and socket joint which comprises an outer open ended socket, a rigid liner in said socket having a converging bearing wall registering with one open end of the socket and an open bottom in the socket adjacent the other open end thereof, a rigid ball member tiltable on the converging end of the liner, said ball member having a cylindrical bore therethrough and a flat end face in spaced relation from the open end of the liner, a rigid closure disk in the socket bottomed against the liner, said socket extending beyond the closure disk, a deformed portion on the extended part of the socket underlying the marginal periphery of the closure member to clamp the closure member against the liner, said closure member having a centrally dished well defining portion, a solid plug of elastomeric material in said well, a stud rotatably mounted in the aperture of the ball member having a head underlying the ball member in thrust relation therewith, said head having a diameter greater than the diameter of said well and said plug and directly contracting and substantially confining said plug in said well and into conforming shape with said head, and said deformed plug resiliently urging the stud into axial thrusting relation with the ball for carrying the ball into good bearing relation with the liner.

2. A multiple bearing ball and socket type joint including a metal socket having a non-yielding internal converging bearing wall accommodating tilting movement, a metal ball member in said socket tiltable on said bearing wall, a metal stud having a shank extending through the ball member in rotatable relation and a head underlying the ball member in axial thrust relation, a metal closure disk secured in the socket under the stud and having a central depressed portion providing a cup-shaped well having a diameter less than the diameter of the stud head and receiving a portion of the stud head therein, and a plug of elastomeric material snugly seated in said well and deformed and substantially completely confined in the well by the stud head into directly contracting and conforming relation with the stud, said plug thus being compressively loaded to urge the stud into axially thrusting relation with the ball and to thereby urge the ball into good bearing relation with the bearing wall of the socket.

References Cited in the file of this patent

UNITED STATES PATENTS

| | | |
|---|---|---|
| 1,934,223 | Booth | Nov. 7, 1933 |
| 2,292,675 | Thiry | Aug. 11, 1942 |
| 2,292,676 | Thiry | Aug. 11, 1942 |
| 2,569,823 | Moskowitz | Oct. 2, 1951 |
| 2,645,510 | Booth | July 14, 1953 |
| 2,733,087 | Latzen | Jan. 31, 1956 |

FOREIGN PATENTS

| | | |
|---|---|---|
| 478,294 | Canada | Nov. 6, 1941 |
| 859,701 | Germany | Aug. 11, 1942 |